Nov. 7, 1950            G. P. FRICK            2,528,589

CONTROL APPARATUS

Filed Nov. 13, 1946

*INVENTOR.*
GEORGE P. FRICK

BY Arthur H. Swanson

ATTORNEY.

Patented Nov. 7, 1950

2,528,589

UNITED STATES PATENT OFFICE 2,528,589

CONTROL APPARATUS

George P. Frick, Wayne, Pa., assignor, by mesne assignments, to Minneapolis-Honeywell Regulator Company, Minneapolis, Minn., a corporation of Delaware Application November 13, 1946, Serial No. 709,669

8 Claims. (Cl. 175—320)

The general object of the present invention is to provide an improved control apparatus or system. A more specific object of the invention is to provide an improved control apparatus or system for use in detecting an abnormal change in the conductivity of a flame, such, for example, as occurs when the flame is extinguished, and for producing a warning or controlling effect when such a change is detected. It has long been recognized that in the use of ordinary gas burners, and particularly industrial gas burners, the accidental extinction of the burner flame, without a corresponding interruption of the supply of gas to the burner, is apt to result in a dangerous accumulation of gas in or near the apparatus, which, when ignited, may cause much damage.

Regular commercial use has been made for some years of a protective system which minimizes risk of damage due to gas burner flame extinction and which is disclosed and claimed in an application of Jones, Serial No. 670,353, filed May 17, 1946, which issued as Patent No. 2,435,940 on February 10, 1948 and which is a continuation of the Jones application Serial No. 404,523, filed July 29, 1941, now abandoned. An improved form of the system disclosed in said Jones patent is disclosed in the Shaffer Patent No. 2,402,117.

A protective system of the type disclosed in the Jones and Shaffer patents comprises means for establishing an electric circuit network including the flame, and comprises electric discharge means for impressing unidirectional potential pulses on said network and thereby creating current flow in said network, and also comprises means for detecting and amplifying the changes in the current flow through the network which result from the extinction of the flame, and means for producing a suitable corrective or warning effect such as the closure of a gas valve or the actuation of an alarm.

A primary object of the present invention is to improve the protective system disclosed in said Jones and Shaffer patents by simplifying the circuit network including the flame, and in particular, by simplifying the means for impressing unidirectional potential pulses on said network. A more specific object of the invention is to so form and arrange the circuit network that the energization of the latter may be wholly effected by a single source of alternating current which ordinarily will be a secondary winding of a transformer having its primary winding connected across supply conductors supplying alternating current of commercially available frequency and voltage, such, for example, as 60 cycles per second and 115 volts.

A more specific object of the invention is to provide a control system, or circuit network, with a relay, comprising an energizing coil and a parallel connected condenser, a source of alternating current, and means energized by said alternating current source to pass one set of recurring unidirectional current pulses through the relay under all conditions of operation, and to pass or prevent the passage through the relay, depending on operating conditions, of another set of recurring unidirectional current pulsations. The current pulses of the two sets are so relatively timed and directed that they combine to form an alternating current, and the relay is constructed and arranged to discriminate between alternating and unidirectional currents.

In the preferred gas burner protection arrangement hereinafter described, the second set of current pulses are prevented from passing through the relay by the action of the flame in normal operation, and pass through the relay when the flame is extinguished, and also when the protective system is rendered inoperative by an apparatus failure. The relay is arranged to be deenergized or energized accordingly as both sets of pulses, or only the first set of pulses, are passing through the relay.

The various features of novelty which characterize my invention are pointed out with particularity in the claims annexed to, and forming a part of this specification. For a better understanding of the invention, however, its advantages, and specific objects attained by its use, reference should be had to the accompanying drawings and descriptive matter, in which I have illustrated and described a preferred form of the present invention.

Figure 1:
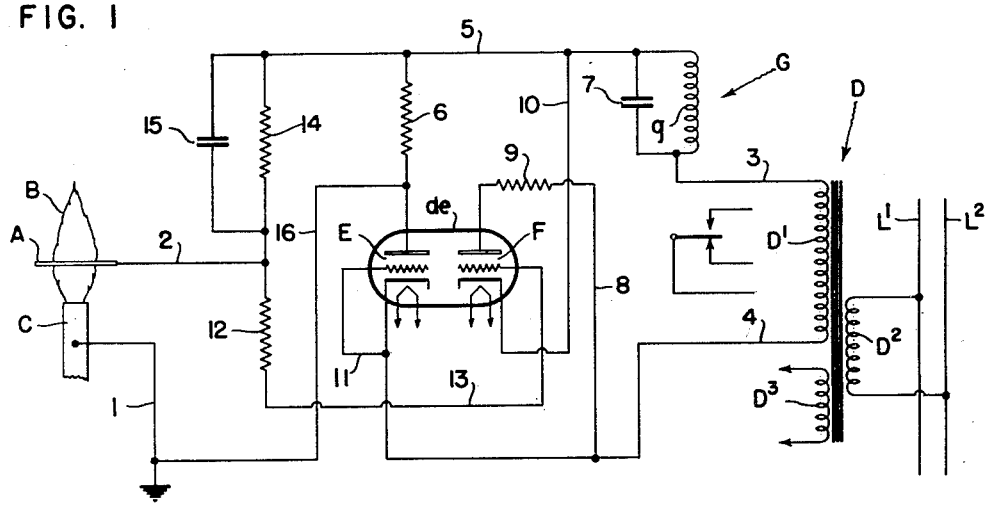
Fig. 1 is a wiring diagram illustrating a simple embodiment of the present invention.

In Fig. 1, I have diagrammatically illustrated an embodiment of the present invention in which a flame electrode A extends into the flame B of a gas burner C having a ground connection I. The flame electrode A has its terminal 2 connected to a circuit network including a source of alternating current in the form of the secondary winding D' of a transformer D having a primary winding D² connected across supply conductors L' and L² supplying alternating current of ordinary commercial frequency and voltage: for example, 60 cycles per second and 115 volts. The end terminals 3 and 4 of the secondary winding D' are connected to the anodes of electronic valves E and F, respectively. As shown, the valves E and F are enclosed in a single tube de which may be of the commercially available 7N7 type. The transformer D has a secondary winding D³ which supplies heating current to the cathode heating filaments of the tube de.

In the form shown in Fig. 1, the transformer terminal 3 is directly connected to one terminal of the winding g of a relay G, and the other terminal of the winding g is connected to the anode of the valve E through a conductor 5 and a load resistor 6. A by-pass condenser 7 is connected in parallel with the relay winding g. The cathode of the valve E is directly connected to the transformer terminal 4. The transformer terminal 4 is also connected through a branch conductor 8 and load resistor 9 to the anode of the valve F. The cathode of the valve F is connected by a conductor 10 to the conductor 5 and thereby through the winding g of relay G and by-pass condenser 7 to the terminal 3 of the transformer secondary winding D'. The triode E has its control grid connected to its cathode by a conductor 11 so that the valve E operates as a diode rectifier. The terminal 2 of the flame electrode A is connected to the control grid of the valve F through a resistor 12 and a conductor 13. The flame electrode terminal 2 is also connected to the conductor 5 through a resistor 14 of relatively high resistance, and a condenser 15 in parallel therewith. The anode of the rectifier valve E has a direct ground connection 16.

In the normal operation of the apparatus shown diagrammatically in Fig. 1, use is made of the fact that the burner flame provides a conductive path of relatively high resistivity for current flow between the burner body C and electrode A. It is now generally recognized that the conductivity of the flame is due wholly or mainly to ionized particles in an outer envelope portion of the flame which have been formed by the chemical reaction between the oxygen of the air and the carbon and hydrogen of the gas uniting in combustion with the air. The resistance of the flow path between the flame electrode and the burner body is relatively high, being of the order of 50 megohms in an arrangement of the type and form shown in Fig. 1.

The apparatus disclosed herein is operative to make the energization of the relay G automatically dependent on three different operating conditions, as follows:

(1) In the normal operating condition, the burner flame B provides a high resistance conductive path between the burner body C and the flame electrode A, which permits the relay G to be energized;

(2) In the abnormal operating condition in which the flame B is not maintained, the absence of a conductive path between the burner body C and flame electrode A prevents the energization of the relay G; and (3) In the abnormal condition in which there is a short circuit connection between the burner body C and flame electrode A, the low resistance of said connection prevents the energization of the relay G regardless of the existence or extinction of the burner flame.

Figure 2:
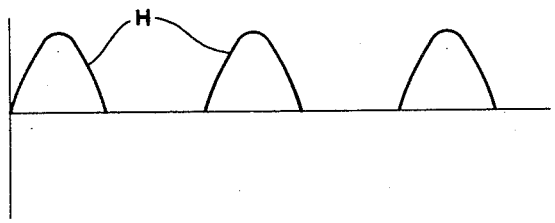
Fig. 2 is a diagram showing the wave form of the relay current of Fig. 1 in normal operation.

In the normal operating condition of the apparatus, voltage across the load resistor 6, during each half cycle in which the transformer terminal 3 is positive relative to the terminal 4, produces a current flow through a circuit including the burner flame and condenser 15 which gives the latter a charge corresponding to said voltage. The circuit through which that current flows may be traced from the lower end of the resistor 6 through the conductor 16, conductor 1, burner body C, flame B, flame electrode A, conductor 2, and resistor 14 and condenser 15 in parallel therewith to the upper end of the resistor 6. The resistance of the resistor 14 is high enough to prevent the charge acquired by the condenser 15 during said half cycle from being discharged during the following half cycle. Thus, the valve F is biased to cut-off during the half cycles in which the transformer terminal 4 makes the anode of the valve F positive relative to the cathode of that valve. In normal operation, therefore, the current flow through the flame B prevents the valve F from becoming conductive, so that the only current flow through the relay G consists of the unidirectional pulses H flowing through the half wave rectifier valve E. The D. C. component to those pulses flows through the winding g of the relay G and maintains the energization of the latter during normal operation, as indicated in Fig. 2.

Figure 3:
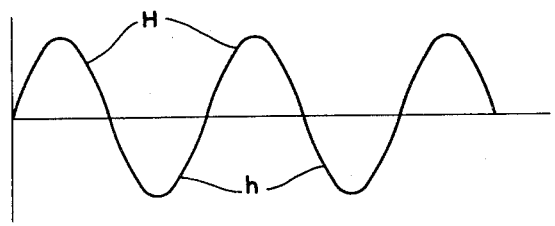
Fig. 3 is a diagram showing the wave form of the relay current of Fig. 1 when the flame is extinguished, or when the flame electrode and burner are connected by a short circuit.

In the abnormal condition in which the flame is extinguished, the voltage across the resistor 6 does not create a current flow impressing a charge on the condenser 15. In consequence, during the half cycles in which the terminal 4 is positive relative to the transformer terminal 3, the control grid and cathode of the valve F are at the same potential so that the valve F is then conductive and hence delivers unidirectional current pulses h to the circuit network which are displaced 180° in phase from the pulses H. In consequence, the two sets of pulses then flowing through the relay G collectively form an alternating current, the average value of which approaches zero, as shown in Fig. 3. That current does not flow through the relay winding g, but flows instead through the by-pass condenser 7, with the result that the relay G is deenergized by the extinction of the burner flame.

In the abnormal condition in which a short circuit connection between the burner body C and flame electrode A exists, the condenser 15 does not prevent the valve F from becoming conductive during the half cycles in which the transformer terminal 4 is positive relative to the terminal 3, for the reason that the resistors 6 and 14 then collectively form a conductive path for the discharge of the condenser 15 with a sufficiently small time constant so as to permit the valve F to become conductive during each of said half cycles.

For operation as above described, the resistance values of the resistors 6 and 14 should be properly related to one another and to the capacitance of the condenser 15, and to the voltage of the transformer secondary winding D'. Thus, for example, if said voltage is 300 volts, the capacitance of the condenser 15 may be 0.005 mfd., and the resistance of the resistors 14 and 6 may be 25 megohms and 2000 ohms, respectively. While the inductance, capacitance and resistance of the circuit elements g, 7 and 12 may vary quite widely, it is noted, by way of illustration and example, that with apparatus of the character illustrated in Fig. 1 in which the winding D', resistors 6 and 14 and condenser 15 have the respective voltage, resistance and capacitance values stated above, good operating results were obtained with a winding g having an inductance of 100 henrys, a condenser 7 having a capacitance of 2 mfd., and a resistor 12 having a resistance of 1 megohm.

The relay G is thus well adapted to actuate a signal device whenever the flame is extinguished, and whenever the protective system becomes inoperative as a result of the grounding of the flame electrode. The signal device thus actuated may take any usual or appropriate form. For example, it may be a lamp or a bell. In lieu of, or in addition to, its operation of a signal device, the relay G may well be adapted in many cases to produce a corrective or safety effect when deenergized. Thus, for example, deenergization of the relay G may operate to close a valve controlling the supply of gas to burner C in the same manner in which the gas supply valve is closed under similar conditions in the apparatus disclosed in the above mentioned Jones and Shaffer patents. Inasmuch as the closure of the gas supply valve on the deenergization of the relay G involves nothing claimed as novel herein, and means for the purpose are fully disclosed in the above prior patents, illustration or further description herein of the cut-off valve and its operating mechanism is unnecessary.

While, in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. Control apparatus, comprising in combination, an electronic half-wave rectifying valve and an electronic amplifying valve, each having an anode and a cathode and an output circuit including said anode and cathode and comprising a portion common to the output circuit of the other, an energizing circuit having two terminals and adapted, when connected to a source of alternating current, to cause an alternating voltage to exist between said terminals, a relay winding and a by-pass condenser connected in said common output circuit portion with said winding and said condenser in parallel with one another and each in series between said terminals, one of said terminals being connected to the anode of one of said valves and the other of said terminals being connected to the anode of the other of said valves, and means responsive to a variable controlling condition for making said amplifying valve conductive or non-conductive on a predetermined change in said condition, whereby with said rectifying valve in continuous operation an alternating current flows through said condenser or a pulsating unidirectional current flows through said winding accordingly as the last mentioned valve is, or is not, conductive.

2. Control apparatus, comprising in combination, an electronic half-wave rectifying valve and an electronic amplifying valve, each having an anode and a cathode and an output circuit including said anode and cathode and comprising a portion common to the output circuit of the other, a load resistor included in the output circuit of said rectifying valve, an energizing circuit having two terminals and adapted, when connected to a source of alternating current, to cause an alternating voltage to exist between said terminals, a relay winding and a by-pass condenser connected in said common output circuit portion with said winding and said condenser in parallel with one another and each in series between said terminals, one of said terminals being connected to the anode of one of said valves, and the other of said terminals being connected to the anode of the other of said valves, and means responsive to a variable controlling condition through which said load resistor makes said amplifying valve non-conductive when said condition attains a predetermined character.

3. Control apparatus, comprising in combination, an electronic half-wave rectifying valve and an electronic amplifying valve, each having an anode and a cathode and an output circuit including said anode and cathode and comprising a portion common to the output circuit of the other, an energizing circuit having two terminals and adapted, when connected to a source of alternating current, to cause an alternating voltage to exist between said terminals, a relay winding and a by-pass condenser connected in said common output circuit portion with said winding and said condenser in parallel with one another and each in series between said terminals, one of said terminals being connected to the anode of one of said valves and the other of said terminals being connected to the anode of the other of said valves, a load resistor in the output circuit of said rectifier valve, said amplifying valve having a control grid and an input circuit including said grid, a bias resistor and a second condenser connected in parallel in said input circuit, and means responsive to a variable controlling condition for operatively establishing or interrupting a shunt to said bias resistor and said second condenser including said load resistor, and thereby making said amplifying valve non-conductive or conductive accordingly as said condition has one or another value.

4. In control apparatus, a circuit network including an energizing circuit having two terminals and adapted, when connected to a source of alternating current, to cause an alternating voltage to exist between said terminals, a relay comprising a winding and associated by-pass condenser, a load resistor, a control resistor and an associated by-pass condenser, an electronic half-wave rectifier valve, an electronic amplifier valve, each of said valves having an anode and a cathode and an output circuit comprising a portion common to the output circuit of the other in which said winding and associated by-pass condenser are connected between said terminals, the anode of said rectifier valve being connected through said load resistor to one of said terminals and the other of said terminals being connected to the anode of said amplifier valve, the latter having a control grid and an input circuit connecting said grid to the cathode of said amplifier valve through said control resistor and the second mentioned by-pass condenser in parallel therewith, and means responsive to a variable control condition and operating on predetermined changes in said condition to respectively open and close a shunt to said control resistor and said second mentioned condenser which includes said load resistor, the latter, said control resistor and said second mentioned condenser being relatively proportioned and arranged to maintain or to dissipate, during each alternating current half cycle in which said rectifier valve is non-conductive, a portion of the charge acquired by said second mentioned condenser during the preceding half cycle accordingly as said shunt is respectively closed or open, whereby said amplifying valve is kept continuously non-conductive while said shunt is closed, and is intermittently conductive while said shunt is open during the alternating current half cycles in which said rectifier valve is non-conductive.

5. Protective apparatus for use with a gas burner, comprising in combination, an electronic half-wave rectifying valve and an electronic amplifying valve having a control grid, each of said valves having an anode and a cathode and an output circuit including said anode and cathode and comprising a portion common to the output circuit of the other, an energizing circuit having two terminals and adapted, when connected to a source of alternating current, to cause an alternating voltage to exist between said terminals, a relay winding and a by-pass condenser connected in said common output circuit portion with said winding and said condenser in parallel with one another and each in series between said terminals, one of said terminals being connected to the anode of said rectifying valve and the other of said terminals being connected to the anode of said amplifying valve, and means including an electrode adapted to extend into the gas burner flame space and responsive to a variable controlling condition for making said amplifying valve conductive or non-conductive on a predetermined change in said condition and thereby respectively causing an alternating current flow through said condenser or a pulsating unidirectional current flow through said winding.

6. Protective apparatus for use with a gas burner normally maintaining a flame in an adjacent flame space, comprising a flame electrode for extension into said flame space, a circuit network connected to said electrode and including an energizing circuit having two terminals and adapted, when connected to a source of alternating current, to cause an alternating voltage to exist between said terminals, a relay comprising a winding and associated by-pass condenser, a load resistor, a control resistor, a second by-pass condenser connected in parallel with said control resistor, an electronic half-wave rectifier valve, an electronic amplifier valve, each of said valves having an anode and a cathode and an output circuit comprising a portion common to the output circuit of the other and in which said winding and associated by-pass condenser are connected between said terminals, the anode of said rectifier valve being connected through said load resistor to one of said terminals and the other of said terminals being connected to the anode of said amplifier valve, the latter having a control grid and an input circuit including said grid and connected to the cathode of said amplifier valve through said control resistor and said second condenser in parallel therewith, and means including said flame electrode through which the burner flame, when it is in its normal condition, connects said load resistor in series with said control resistor and said second condenser and thereby maintains said amplifier valve in a non-conductive condition during alternating current half cycles in which said rectifier valve is non-conductive.

7. Protective apparatus for use with a gas burner normally maintaining a flame in an adjacent flame space, comprising a circuit network including an energizing circuit having two terminals and adapted, when connected to a source of alternating current, to cause an alternating voltage to exist between said terminals, a relay comprising a winding and associated by-pass condenser, a load resistor, a control resistor, a second condenser connected in parallel with said control resistor, a third resistor, an electronic half-wave rectifier valve, an electronic amplifier valve, each of said valves having an anode and a cathode and an output circuit comprising a portion common to the output circuit of the other and in which said winding and by-pass condenser are connected between said terminals, the anode of said rectifier valve being connected through said load resistor to one of said terminals and the other of said terminals being connected to the anode of said amplifier valve, the latter having a control grid and an input circuit including said control and third resistors and said second condenser and in which said third resistor is connected to said grid and connects the latter to the cathode of said amplifier valve through said control resistor and said second condenser, a conductor connected to the rectifier valve anode for connecting the latter to the gas burner, and a flame electrode connected to said input circuit between said third control and resistors for extension into said flame space, said load and third resistors resistor and the capacitance of said second condenser and the voltage between said terminals being so related that in normal operation a charge is impressed on said second condenser during each half cycle in which said rectifier valve is conductive which is too large to be discharged and thereby makes said amplifier valve non-conductive during the following half cycle in which said rectifier valve is not conductive, whereby the current flow through the portion of the output circuit of each valve common to the output circuit of the other valve is a pulsating unidirectional current, or is an alternating current, accordingly as the burner flame is, or is not, maintained.

8. Protective apparatus for use with a gas burner normally maintaining a flame in an adjacent flame space, comprising a circuit network including an energizing circuit having two terminals and adapted, when connected to a source of alternating current, to cause an alternating voltage to exist between said terminals, a relay comprising a winding and associated by-pass condenser, a load resistor, a control resistor, a second condenser connected in parallel with said control resistor, a third resistor, an electronic half-wave rectifier valve, an electronic amplifier valve, each of said valves having an anode and a cathode and an output circuit comprising a portion common to the output circuit of the other and in which said winding and by-pass condenser are connected between said terminals, the anode of said rectifier valve being connected through said load resistor to one of said terminals and the other of said terminals being connected to the anode of said amplifier valve, the latter having a control grid and an input circuit including said control and third resistors and said second condenser and in which said third resistor is connected to said grid and connects the latter to the cathode of said amplifier valve through said control resistor and said second condenser, a conductor connected to the rectifier valve anode for connecting the latter to the gas burner, and a flame electrode connected to said input circuit between said third and control resistors for extension into said flame space, said load and third resistors resistor and the capacitance of said second condenser and the voltage between said terminals being so related that in normal operation a charge is impressed on said second condenser during each half cycle in which said rectifier valve is conductive which is too large to be discharged and thereby makes said amplifier valve non-conductive during the following half cycle in which said rectifier valve is not conductive, and are so related that when said flame electrode and burner are connected by a short circuiting connection, said second condenser discharges rapidly enough during the half cycles in which said rectifier valve is not conductive to make said amplifier valve conductive, whereby the current flow through the portion of the output circuit of each valve common to the output circuit of the other valve is a pulsating unidirectional current in normal operation and is an alternating current when said short circuiting connection exists.

GEORGE P. FRICK.

REFERENCES CITED

The following references are of record in the file of this patent:

UNITED STATES PATENTS

| Number | Name | Date |
|---|---|---|
| 2,112,736 | Cockrell | Mar. 29, 1938 |
| 2,268,411 | Luce | Dec. 30, 1941 |
| 2,343,001 | Cohen | Feb. 29, 1944 |
| 2,391,882 | Conn | Jan. 1, 1946 |
| 2,402,083 | Reid | June 11, 1946 |